(12) United States Patent
Selan

(10) Patent No.: US 7,197,182 B2
(45) Date of Patent: Mar. 27, 2007

(54) COLOR-MATCHED DIGITAL PLAYBACK

(75) Inventor: Jeremy A. Selan, Santa Monica, CA (US)

(73) Assignees: Sony Corporation, Tokyo (JP); Sony Pictures Entertainment Inc., Culver City, CA (US)

(*) Notice: Subject to any disclaimer, the term of this patent is extended or adjusted under 35 U.S.C. 154(b) by 282 days.

(21) Appl. No.: 11/008,344

(22) Filed: Dec. 8, 2004

(65) Prior Publication Data

US 2005/0122536 A1  Jun. 9, 2005

Related U.S. Application Data

(60) Provisional application No. 60/528,051, filed on Dec. 9, 2003.

(51) Int. Cl.
*G06K 9/00* (2006.01)

(52) U.S. Cl. .................................................. 382/167

(58) Field of Classification Search ................ 382/16, 382/167, 274–276; 348/96, 97, 231.99, 675; 358/515–523, 3.2, 1.9, 537; 345/589–604
See application file for complete search history.

(56) References Cited

U.S. PATENT DOCUMENTS

| | | | |
|---|---|---|---|
| 5,809,164 A | 9/1998 | Hultgren, III | 382/162 |
| 6,525,765 B1 | 2/2003 | Brett et al. | 348/97 |
| 6,671,000 B1 | 12/2003 | Cloutier | 348/675 |
| 6,697,519 B1 | 2/2004 | Rao | 382/162 |
| 6,754,399 B2 | 6/2004 | Pettigrew et al. | 382/276 |
| 7,053,927 B2 * | 5/2006 | Jones et al. | 348/97 |
| 2001/0036310 A1 | 11/2001 | Pettigrew et al. | 382/167 |
| 2003/0234960 A1 | 12/2003 | Kaltenbach et al. | 358/3.24 |
| 2004/0036695 A1 | 2/2004 | Pethania et al. | 345/601 |

* cited by examiner

*Primary Examiner*—Ishrat Sherali
(74) *Attorney, Agent, or Firm*—Samuel S. Lee; Procopio, Cory, Hargreaves & Savitch LLP

(57) ABSTRACT

Perceptually correctly rendering a color-matched image of a digital imagery including receiving and storing a digital data set representing the digital imagery; computing a three-dimensional lookup table (3-D LUT) using a color transform stack; simulating a real-time film-appearance using the computed 3-D LUT mapped on a graphics card; projecting a first image generated by the graphics card; comparing the first image with a second image generated by a film negative of the digital imagery; and repeating the computing, the simulating, the projecting, and the comparing when the first image is not perceptually substantially similar to the second image.

44 Claims, 5 Drawing Sheets

COLOR-MATCHED DIGITAL PLAYBACK

CROSS-REFERENCE TO RELATED APPLICATIONS

This application claims the benefit of priority of co-pending U.S. Provisional Patent Application Ser. No. 60/528,051, entitled "Color-Matched Digital Playback", filed Dec. 9, 2003. Benefit of priority of the filing date of Dec. 9, 2003 is hereby claimed, and the disclosure of the Provisional Patent Application is hereby incorporated by reference.

BACKGROUND

Digital images are typically created, viewed, and manipulated using computers. Thus, judgments concerning the desired appearance of the digital images are made based on how the images appear when displayed on digital display devices. When the digital images are created and manipulated for a motion picture, the image data stored on the computer must be converted into film images for projection in a theater.

Digital film recorders are used to convert the digital images into images on photosensitive motion picture film. The conventional digital film recorders use a light source (e.g., a laser) to expose each frame of the film as necessary to produce the desired image in the frame. The film is then advanced to the next frame and the process is repeated. When a strip of film has been recorded, it is sent to a laboratory for development into a color negative and, later, a positive print.

To provide a high quality digital motion picture, it is desirable to have the appearance of the motion picture that is projected and viewed by a theater audience match the appearance contemplated by the producer. Thus, the color of each location on the exposed film should substantially match the color of the corresponding picture element ("pixel") on the digital display device used by the producer to produce the image. That is, color accurate renditions of the digital film imagery are desired. Matching the calorimetric appearance of a digital film, however, is an intricate problem because the appearance is influenced by the film development processes, disparate projection technologies, and varying viewing environments.

Conventional approaches to producing color images on film that match the originally produced digital images include using a measurement-based solution. By characterizing the digital display device and film response, a visual correspondence can be computed between the film and the digital projection. However, simply relying on the photometrically "correct" solution does not typically yield satisfactory results because the solution ignores the perceptual impact of differing viewing environments.

One difficulty in producing a film image that corresponds visually to the original digital image produced and/or stored on a computer includes what is sometimes referred to as a "gamut mismatch", which involves the inability of the film to reproduce all the colors reproducible on the digital display device. One conventional solution is to map the colors, which are outside the film's gamut, to the closest point on the surface of the film's gamut while maintaining the colors that are initially inside the gamut. This solution, however, results in abrupt color changes and produces banding artifacts in the final image.

SUMMARY

The present invention provides method and apparatus for perceptually correctly rendering a color-matched image of a digital imagery. In one implementation, the method comprises: receiving and storing a digital data set representing the digital imagery; computing a three-dimensional lookup table (3-D LUT) using a color transform stack; simulating a real-time film-appearance using the computed 3-D LUT mapped on a graphics card; projecting a first image generated by the graphics card; comparing the first image with a second image generated by a film negative of the digital imagery; and repeating the computing, the simulating, the projecting, and the comparing when the first image is not perceptually substantially similar to the second image.

In another implementation, a color-matched digital image renderer comprises: a disk array for storing a digital data set represented by the digital imagery; a three-dimensional lookup table (3-D LUT) for simulating a real-time film-appearance of the digital data set; a mapping element for mapping the 3-D LUT on a trilinear interpolator of a graphics card; a projector for displaying a first image generated by the graphics card, such that the first image can be compared with a second image generated by a film negative of the digital imagery, wherein a new 3-D LUT is generated when the first image is not perceptually substantially similar to the second image.

In another implementation, a computer program, stored in a tangible storage medium, for rendering a color-matched image of a digital imagery, the program comprising executable instructions that cause a computer to: receive and store a digital data set represented by the digital imagery; compute a three-dimensional lookup table (3-D LUT) using a color transform stack; simulate a real-time film-appearance using the computed 3-D LUT mapped on a graphics card; project a first image generated by the graphics card; compare the first image with a second image generated by a film negative of the digital imagery; and repeat the computing, the simulating, the projecting, and the comparing when the first image is not perceptually substantially similar to the second image.

DETAILED DESCRIPTION

To address some of the difficulties facing the conventional approaches to producing color images in motion pictures, various implementations of the present invention are configured to provide methods and systems for color-matched digital image rendering that accurately simulates color response of the film. The implementations enable the artist to use the highly accurate color judgment ability to view, compare, and produce a "perceptually-correct" match between the digitally-projected image and the film image projection using a three dimensional lookup table to transform color.

Several illustrative examples of implementations are presented below. These examples are not exhaustive and additional examples and variations are also described later.

Figure 1:
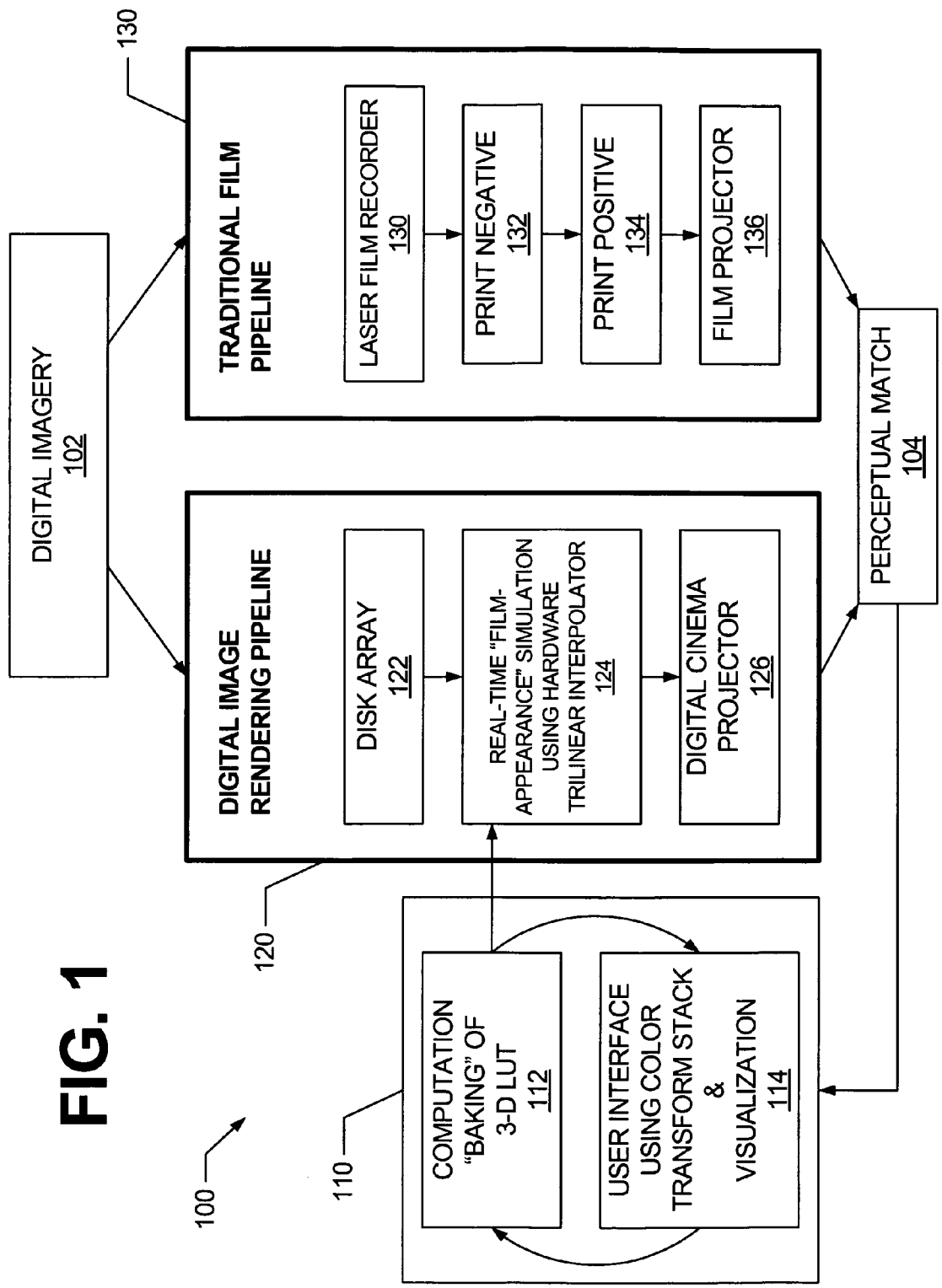
FIG. 1 illustrates one example of a color management system, which includes three pipelines.

FIG. 1 illustrates one example of a color management system 100, which includes three pipelines 110, 120, 130. The pipelines 120 and 130 receive an originally produced digital imagery 102.

The pipeline 120 is a digital-image-rendering pipeline that receives the digital imagery 102 and stores the imagery in a disk array 122. In one implementation, the received digital data is arranged in the disk array 122 to allow an efficient projection by the digital projector 126.

In the illustrated implementation of FIG. 1, the stored digital data in the disk array 122 is transformed by a trilinear interpolator 124 for a real-time "film-appearance" simulation, which is implemented in hardware by applying a three-dimensional lookup table (3-D LUT). The 3-D LUT is a table-organized data set defined as three-dimensional input vectors that are mapped independently to three-dimensional output vectors. In one implementation, (32×32×32) unique entries are maintained, with intermediate samples evaluated using hardware-accelerated trilinear interpolation.

The conventional digital-image rendering pipeline does not use the 3-D LUT in simulating the film gamut because applying and interpolating large three-dimensional data sets in a CPU is computationally expensive. FIG. 1, however, implements the realization that interpolating the three-dimensional data set in the 3-D LUT uses a substantially similar mathematical technique as the trilinear texture interpolation that is commonly used to evaluate MIP-mapped textures on conventional graphics cards. By efficiently mapping the 3-D LUT sampling technique onto the graphics card, the real-time full color "film-appearance" simulation can be realized in hardware.

Since the 3-D LUT lookup operation is already supported in silicon on existing graphics hardware, the LUT is loaded on the graphics card as a 3-D (or volumetric) texture to apply the lookup table. As the image is drawn, each incoming pixel value is treated as an index, and is accessed in the 3-D data set. The resulting value, which defines the final color to draw, is sent to the display. Thus, a "dependent texture" read is used in the RGB domain to adjust the pixel colors as the colors are drawn to the frame buffer.

Once the digital data is transformed by the real-time "film-appearance" simulation 124, the transformed digital data is then transmitted to a digital projector 126 for display. In one implementation, the digital projector 126 includes a digital light processing (DLP) projector that uses an optical semiconductor to digitally manipulate light. In another implementation, the digital projector 126 includes a liquid crystal display (LCD) device.

The pipeline 130 is a traditional film pipeline that receives the digital imagery 102 and records the imagery on a color negative 132 using a laser film recorder 130. The negative 132 is developed into a positive print 134 and is projected onto a film projector 136.

The pipeline 110 is a user interface loop for a producer (or an artist) of the digital image with access to the standard palette of color correction tools 114 including tools for color balance, hue/saturation, and gamma adjustments. A complex color transform is iteratively built up by superimposing multiple adjustment layers on user-defined subsets of the color gamut. A number of transformation layers are used to "bake" or produce a single 3-D LUT.

Another reason the conventional digital-image-rendering pipeline does not use the 3-D LUT in simulating the film gamut is the lack of an effective solution for computing the three-dimensional data sets needed to appropriately transform the images. The conventional approach uses a measurement-based solution that takes a set of samples characterizing the response of film and the display device, and uses a simulation of the human visual system to predict the mapping for all colors. However, since current simulations of the human visual system do not have the accuracy that the film industry requires, the conventional approach cannot provide a satisfactory solution. Furthermore, this approach relies on the flawed assumption of what constitutes the "correct" transform. An ideal image is not one that produces the "mathematically correct" response, but one that is deemed by the artist to be "perceptually correct". For example, in the traditional numerical simulation approach, the final transform is rigidly defined and cannot be adjusted to an end user bias. If an artist views the color simulation and requests the model to be "tweaked", such as "make the midtones warmer", it is very difficult to use traditional 3-D LUT interaction models to achieve the desired results.

In one implementation of the present invention, the artist uses the highly accurate color judgment ability to view, compare, and produce a "perceptually-correct" match 104 between the digital projection 126 produced in the digital-image-rendering pipeline 120 and the test film projection 136 produced in the traditional film pipeline 130. The production of the "perceptually-correct" match 104 includes a feedback to the user interface loop 110 to allow the artist to interactively manipulate the 3-D LUT color transform 112 until a substantial match of the renditions of the digital projection 126 and the test film projection 136 is achieved.

Thus, producing a "perceptually-correct" solution 104, which includes the effects of differing display gamuts and viewing environments, is reduced to a simple exercise in color grading. The resulting color transformation is "baked" into the 3-D LUT 112, which is then applied in real-time during the "film-appearance" simulation 124 of the digital-image-rendering pipeline 120. The 3-D LUT is used to independently map every input color to a display-specific output color.

Figure 2:
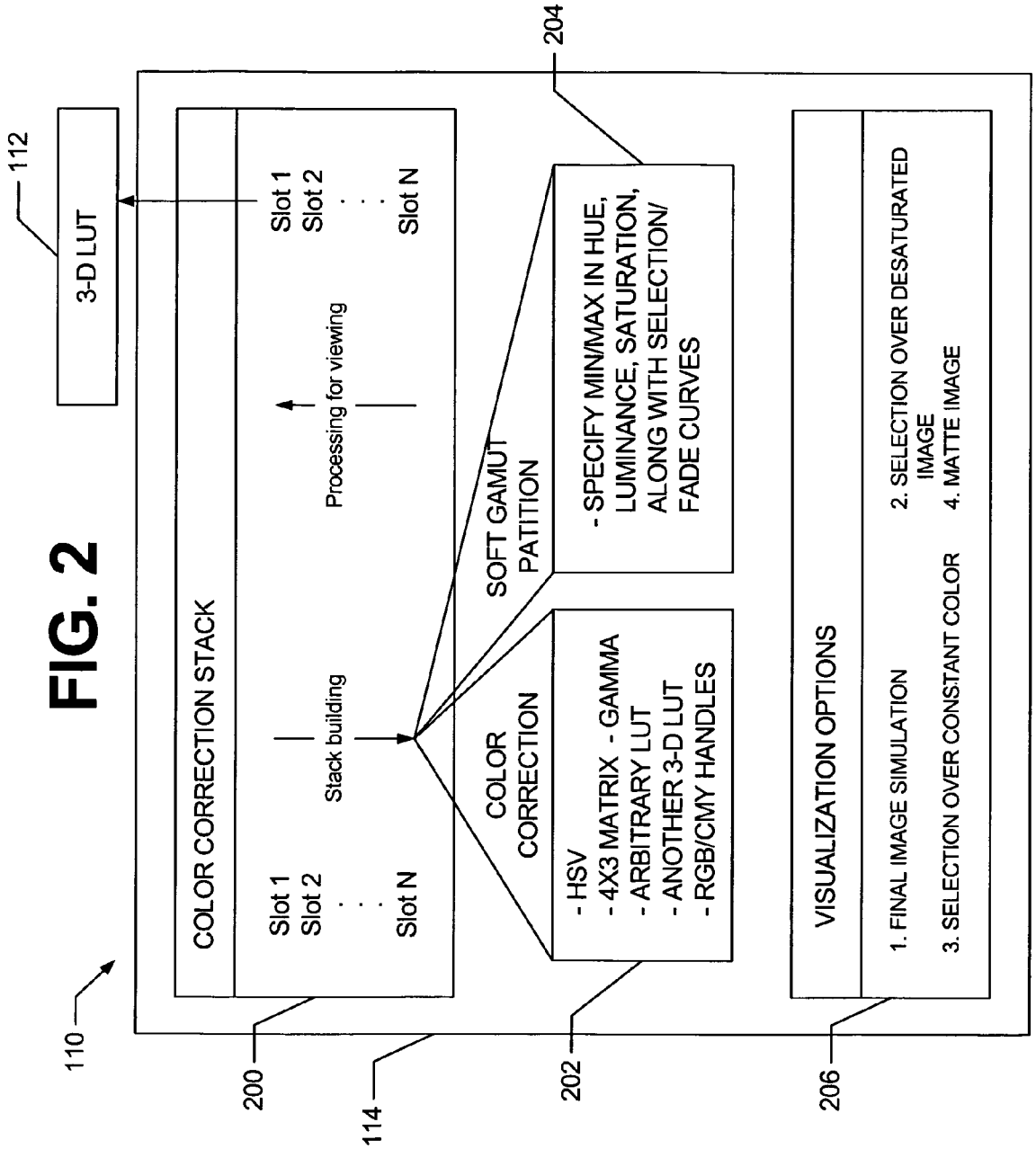
FIG. 2 illustrates one example of a user interface loop for producing a 3-D LUT.

FIG. 2 illustrates one example of a user interface loop 110 for producing the 3-D LUT 112. The user interface loop 110 includes a color correction stack 200 and visualization options 206.

Slots in the color-correction stack 200 are used such that the results of each processing element in a particular slot are fed to the next level up. Thus, the processing element in each slot performs a simple adjustment, such as an adjustment to color balance, matrix, hue, saturation, or gamma correction. For each image operation, the user can define a "partition" 202 of the color space for which to apply the transform. The partition 202 is typically specified as limits to the hue, saturation, and value of incoming lattice point, and includes a user-specified mask. However, in order to minimize discontinuities in the final table, partitions 204 can be "soft" edges, where the color corrections are only partially applied near the selection boundaries.

In the illustrated example of FIG. 2, four image visualization options or modes 206 are allowed to aid the artist in producing the color (film) transformation. The options include: final image simulation; selection partition composited over a desaturated image; selection partition composited over a constant color; and a matte image (i.e., grayscale).

The final image simulation mode shows the results of the complete color correction stack. The selection partition composited over a desaturated image mode shows the currently-edited layer in full color, which is composited over a desaturated version of all layers underneath. This is useful in adjusting the hue-based selection partitions. The selection partition composited over a constant color mode shows the currently-edited layer in full color, which is composited over a constant color (i.e., either black or white). This is useful in adjusting the value-based selection partitions. The matte image mode shows in grayscale the current layer's selection matte.

Figure 3A:
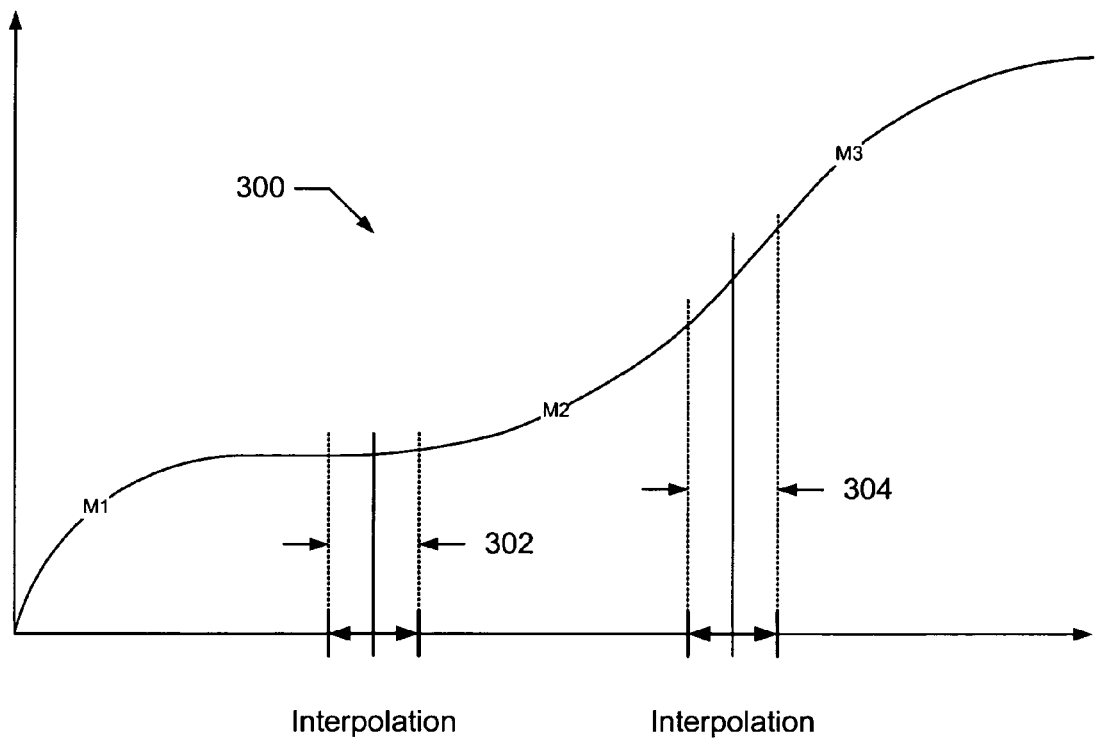
FIGS. 3A and 3B illustrate one example of constructing a 3-D LUT in a process referred to as a "domain of influence" process, in which the relative influence of each color matrix is represented over each range.
Figure 3B:
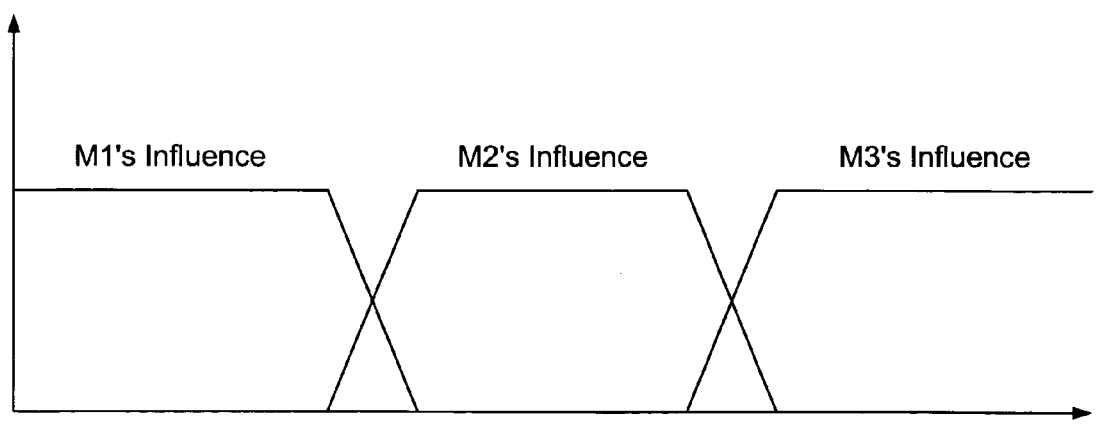

FIGS. 3A and 3B illustrate one example of constructing a 3-D LUT in a process 300 referred to as a "domain of influence" process, in which the relative influence of each color matrix is represented over each range. For example, the user might choose to specify a different color transformation in the shadows, midtones, and highlights of the image. Thus, in the illustrated example, M1 represents the shadow, M2 represents the midtone, and M3 represents the highlight.

Initially, an input identity RGB transform is computed. Then, for each color transformation on the color stack, the input RGB transform is converted based on the input RGB value weighted by the "influence" of that color transform. Boundaries 302, 304 of the influence of each color matrix are interpolated to produce one lattice point (i.e., one of the dimensions of the three dimensional data) in the 3-D LUT.

Figure 4:
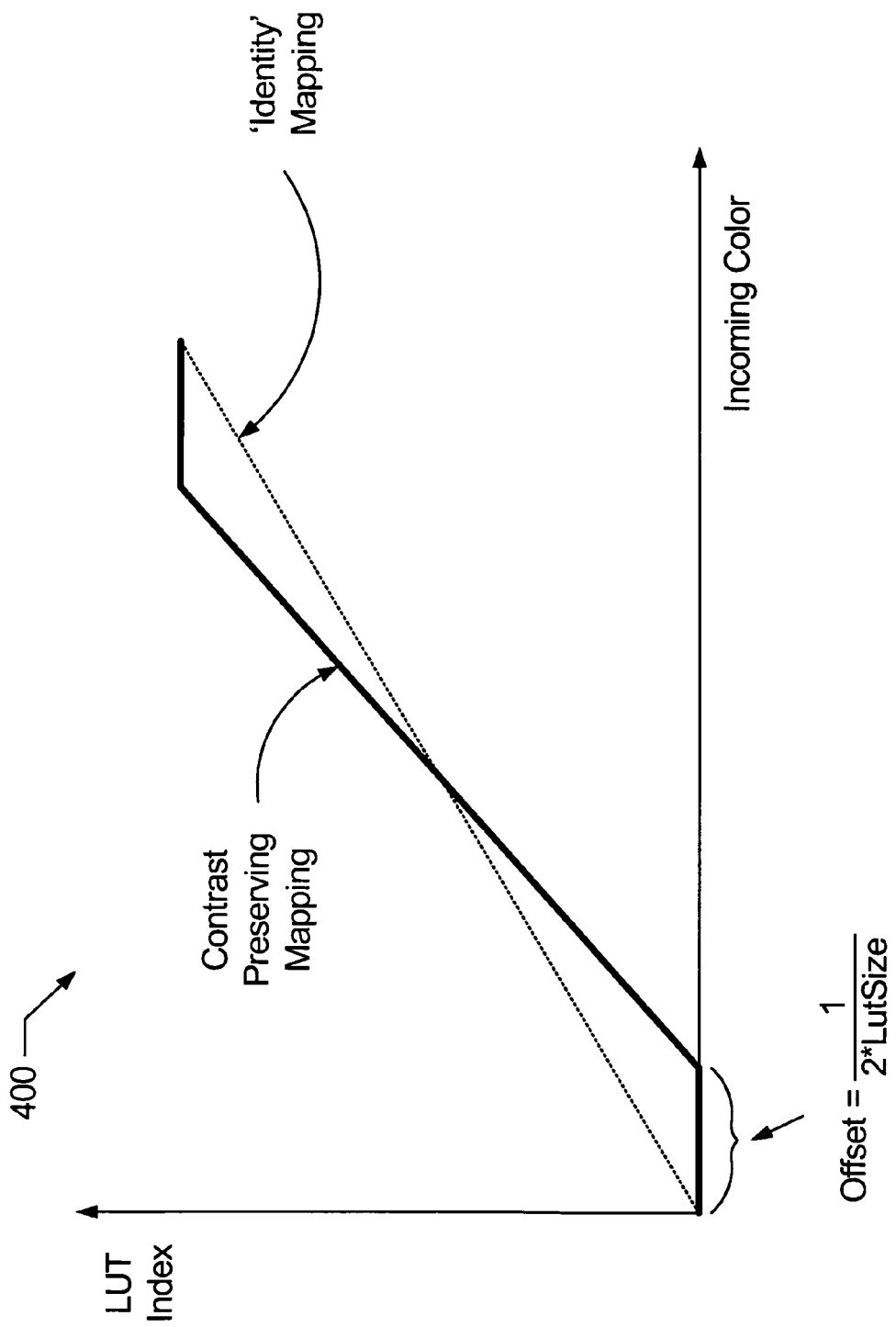
FIG. 4 illustrates one example of a 3-D LUT processing using trilinear interpolation hardware.

FIG. 4 illustrates one example of a 3-D LUT processing 400 using trilinear interpolation hardware. In the illustrated example, the LUT processing is performed to linearly map the incoming color with the LUT index. However, in applying the LUT with this method, the input colors need to be offset and scaled to preserve the contrast of the image, and account for the trilinear interpolation being mathematically ill-defined at the edges of the data set.

In the illustrated example of FIG. 4, the offset and the scale are applied to the LUT indices as follows:

$$\text{Scale} = \frac{\text{LutSize} - 1}{\text{LutSize}}.$$

$$\text{Offset} = \frac{1}{2 * \text{LutSize}}.$$

Thus, for a (32×32×32) LUT, during the dependent texture read, the lookup indices are defined as:

$$\text{LookupIndex} = \text{Scale} * \text{InputColor} + \text{Offset}$$

$$= \left(\frac{31}{32}\right) * \text{InputColor} + \left(\frac{1}{64}\right)$$

Figure 5:
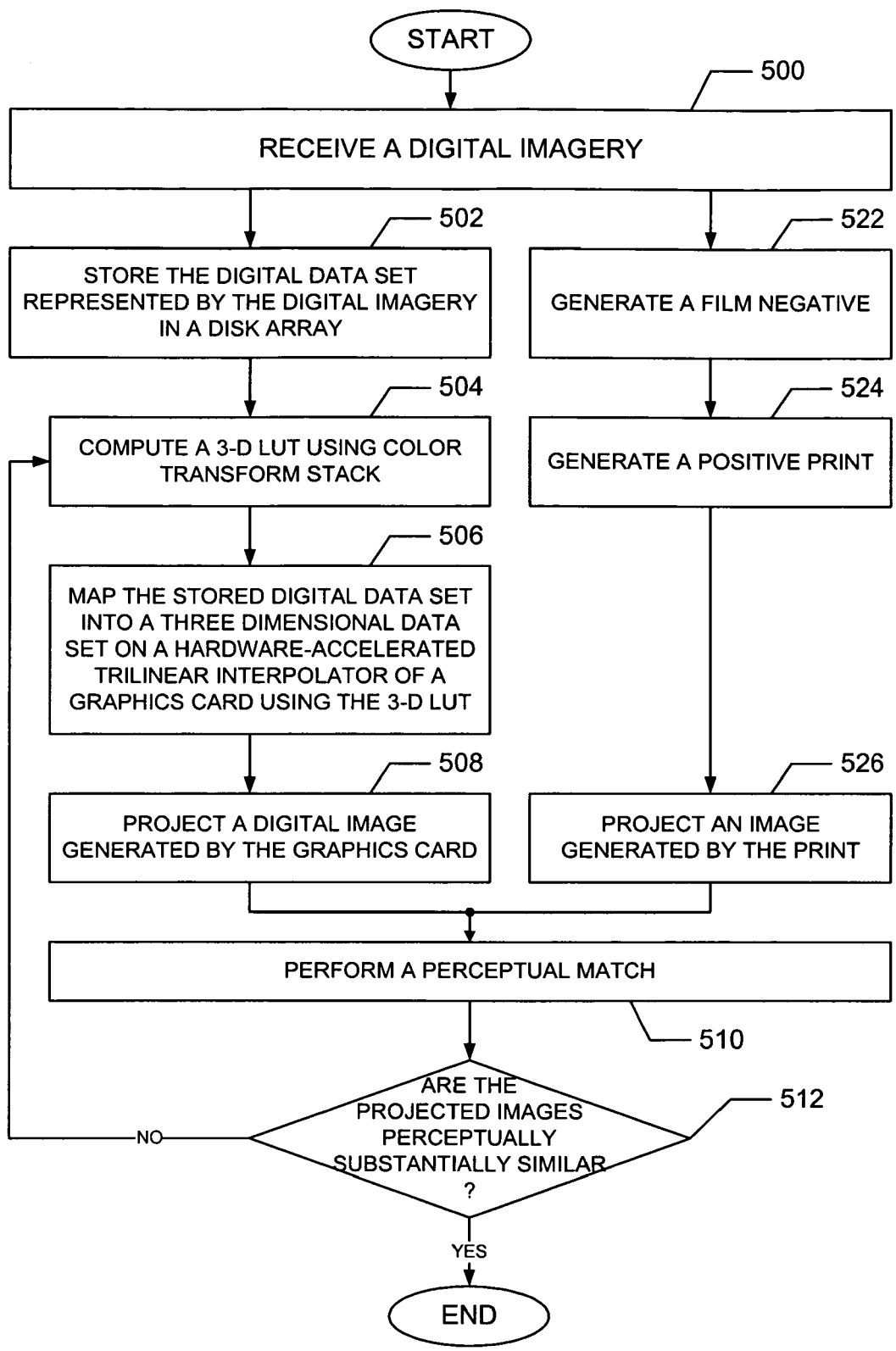
FIG. 5 illustrates one example of a color management method for enabling a color-matched digital image rendering.

FIG. 5 illustrates one example of a color management process to enable a color-matched digital image rendering. In the illustrated example, a digital imagery is received at 500. The digital data set represented by the digital imagery is stored in a disk array at 502. A 3-D LUT is computed, at 504, using a color transform stack computed in the user interface loop of FIG. 1. The 3-D LUT can be computed according to the process described in connection with FIG. 1 through FIG. 4.

A real-time film-appearance simulation is performed by mapping the stored digital data set into a three dimensional data set on a hardware-accelerated trilinear interpolator of a graphics card using the computed 3-D LUT, at 506. An image generated by the graphics card is then projected, at 508.

The received digital imagery is also used to generate a film negative at 522. A positive print is generated at 524. An image generated by the positive print is then projected, at 526.

A perceptual match between the image generated by the graphics card and the image generated by the positive print is performed, at 510, and determined, at 512, whether the images are perceptually substantially similar. If the images are not perceptually substantially similar, another 3-D LUT is computed, at 504. Otherwise, if the images are perceptually substantially similar, the color management process is terminated.

In an alternative implementation, a directed graph (DAG) view can be used, instead of the color correction stack, for more complex image operation chains. This would allow for arbitrary color correction dependencies, and would appear to the user to be a standard compositing node-graph. In another alternative implementation, the 3-D LUT can be double buffered to allow for lengthy LUT calculations.

Various implementations of the invention are realized in electronic hardware, computer software, or combinations of these technologies. Most implementations include one or more computer programs executed by a programmable computer. For example, in one implementation, a color management system includes one or more computers executing software implementing the management of colors discussed above. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Although various illustrative implementations of the present invention have been described, one of ordinary skill in the art will see that additional implementations are also possible and within the scope of the present invention. For example, although the above-discussed implementations have been limited to simulating the color effects of film, these implementations can be used to achieve artistic color modifications in real-time and in an intuitive manner.

Further, these implementations can also be used in any consumer display device that has "knobs" (e.g., gamma, bias, color matrix, and a red-green-blue/cyan-magenta-yellow (RGB/CMY) interpolator) to adjust picture characteristics such as hue, saturation, contrast, brightness, and other related characteristics. Thus, when the user adjusts any of these outward-facing "interfaces", a recalculation of the single internal 3-D LUT that simulates the desired effect can be performed.

The advantage of these implementations is that any number of arbitrarily complex "knobs" can be added without placing additional hardware requirements. For example, a "film-look" knob on a television that simulates the complex calorimetric appearance of different film stocks can be implemented with the above-discussed implementations. These complex "knobs" can also be added to acquisition devices such as video camcorders.

Accordingly, the present invention is not limited to only those implementations described above.

What is claimed is:

1. A method of rendering a color-matched image of a digital imagery, comprising:
    receiving and storing a digital data set representing the digital imagery;
    computing a three-dimensional lookup table (3-D LUT) using a color transform stack;
    simulating a real-time film-appearance using the computed 3-D LUT mapped on a graphics card;
    projecting a first image generated by the graphics card;
    comparing the first image with a second image generated by a film negative of the digital imagery; and
    repeating said computing, said simulating, said projecting, and said comparing when the first image is not perceptually substantially similar to the second image.

2. The method of claim 1, wherein said storing a digital data set includes
    arranging the digital data set in a disk array to allow an efficient projection of the first image.

3. The method of claim 1, wherein said simulating a real-time film-appearance includes
    mapping the digital data set into a three dimensional data set.

4. The method of claim 3, wherein said simulating a real-time film-appearance further includes
    mapping the digital data set on a trilinear interpolator of the graphics card.

5. The method of claim 4, wherein said simulating a real-time film-appearance further includes
    loading the three dimensional data set on the graphics card as a volumetric texture.

6. The method of claim 1, wherein said computing a 3-D LUT using a color transform stack includes
    performing an adjustment to a color gamut.

7. The method of claim 6, wherein the color gamut includes a color balance.

8. The method of claim 6, wherein the color gamut includes a color matrix.

9. The method of claim 6, wherein the color gamut includes hue.

10. The method of claim 6, wherein the color gamut includes a color saturation.

11. The method of claim 6, wherein the color gamut includes a gamma correction.

12. The method of claim 6, wherein said performing an adjustment to a color gamut includes
    partially applying the adjustment near selection boundaries of the digital data set to minimize discontinuities in the 3-D LUT.

13. The method of claim 6, wherein said simulating a real-time film-appearance further includes
    providing a final image simulation to show results of the adjustment to the color gamut.

14. The method of claim 6, wherein said simulating a real-time film-appearance further includes
    providing a selection partition composited over a desaturated image to show results of a currently-edited layer in full color composited over a desaturated version of all layers underneath.

15. The method of claim 6, wherein said simulating a real-time film-appearance further includes
    providing a selection partition composited over a constant color to show results of a currently-edited layer in full color composited over a constant color.

16. The method of claim 6, wherein said simulating a real-time film-appearance further includes
    showing a selection matte of a current layer in grayscale.

17. A color-matched digital image renderer for perceptually correctly rendering a digital imagery, comprising:
    a disk array for storing a digital data set represented by the digital imagery;
    a three-dimensional lookup table (3-D LUT) for simulating a real-time film-appearance of the digital data set;
    a mapping element for mapping the 3-D LUT on a trilinear interpolator of a graphics card;
    a projector for displaying a first image generated by the graphics card, such that the first image can be compared with a second image generated by a film negative of the digital imagery,
    wherein a new 3-D LUT is generated when the first image is not perceptually substantially similar to the second image.

18. The renderer of claim 17, wherein the 3-D LUT is configured using a color transform stack to adjust a color gamut of the first image.

19. The renderer of claim 18, further comprising
    a final image simulator to show results of the adjustment to the color gamut.

20. The renderer of claim 18, further comprising
    a selection partition composited over a desaturated image to show results of a currently-edited layer in full color composited over a desaturated version of all layers underneath.

21. The renderer of claim 18, further comprising
    a selection partition composited over a constant color to show results of a currently-edited layer in full color composited over a constant color such as black or white.

22. The renderer of claim 18, further comprising
    a selection matte of a current layer in grayscale.

23. A computer program, stored in a computer readable medium, for rendering a color-matched image of a digital imagery, the program comprising executable instructions that cause a computer to:
    receive and store a digital data set represented by the digital imagery;
    compute a three-dimensional lookup table (3-D LUT) using a color transform stack;
    simulate a real-time film-appearance using the computed 3-D LUT mapped on a graphics card;
    project a first image generated by the graphics card;
    compare the first image with a second image generated by a film negative of the digital imagery; and
    repeat said computing, said simulating, said projecting, and said comparing when the first image is not perceptually substantially similar to the second image.

24. The computer program of claim 23, wherein executable instructions that cause a computer to store a digital data set include executable instructions that cause a computer to
    arrange the digital data set in a disk array to allow an efficient projection of the first image.

25. The computer program of claim 23, wherein executable instructions that cause a computer to simulate a real-time film-appearance include executable instructions that cause a computer to
    map the digital data set into a three dimensional data set.

26. The computer program of claim 25, wherein executable instructions that cause a computer to simulate a real-time film-appearance further include executable instructions that cause a computer to map the digital data set on a trilinear interpolator of a graphics card.

27. The computer program of claim 26, wherein executable instructions that cause a computer to simulate a real-time film-appearance further include executable instructions that cause a computer to load the three dimensional data set on the graphics card as a volumetric texture.

28. The computer program of claim 23, wherein executable instructions that cause a computer to compute a 3-D LUT using a color transform stack include executable instructions that cause a computer to perform an adjustment to a color gamut.

29. The computer program of claim 28, wherein executable instructions that cause a computer to perform an adjustment to a color gamut include executable instructions that cause a computer to partially apply the adjustment near selection boundaries to minimize discontinuities in the 3-D LUT.

30. The computer program of claim 28, wherein executable instructions that cause a computer to simulate a real-time film-appearance further include executable instructions that cause a computer to provide a final image simulation to show results of the adjustment to the color gamut.

31. The computer program of claim 28, wherein executable instructions that cause a computer to simulate a real-time film-appearance further include executable instructions that cause a computer to provide a selection partition composited over a desaturated image to show results of a currently-edited layer in full color composited over a desaturated version of all layers underneath.

32. The computer program of claim 28, wherein executable instructions that cause a computer to simulate a real-time film-appearance further include executable instructions that cause a computer to provide a selection partition composited over a constant color to show results of a currently-edited layer in full color composited over a constant color such as black or white.

33. The computer program of claim 28, wherein executable instructions that cause a computer to simulate a real-time film-appearance further include executable instructions that cause a computer to show a selection matte of a current layer in grayscale.

34. A renderer for rendering a color-matched image of a digital imagery, comprising:

means for receiving and storing a digital data set represented by the digital imagery;

means for computing a three-dimensional lookup table (3-D LUT) using a color transform stack;

means for simulating a real-time film-appearance using the computed 3-D LUT mapped on a graphics card;

means for projecting a first image generated by the graphics card; and means for comparing the first image with a second image generated by a film negative of the digital imagery, wherein if the first image is not perceptually substantially similar to the second image, a new 3-D LUT is computed by said means for computing and a new first image is generated and compared to the second image by said means for comparing.

35. The renderer of claim 34, wherein said means for storing a digital data set includes means for operatively arranging the digital data set in a disk array to allow an efficient projection of the first image.

36. The renderer of claim 34, wherein said means for simulating a real-time film-appearance includes means for mapping the digital data set into a three dimensional data set.

37. The renderer of claim 36, wherein said means for simulating a real-time film-appearance further includes means for mapping the digital data set on a trilinear interpolator of a graphics card.

38. The renderer of claim 37, wherein said means for simulating a real-time film-appearance further includes means for loading the three dimensional data set on the graphics card as a volumetric texture.

39. The renderer of claim 34, wherein said means for computing a 3-D LUT using a color transform stack includes means for performing an adjustment to a color gamut.

40. The renderer of claim 39, wherein said means for performing an adjustment to a color gamut includes means for partially applying the adjustment near selection boundaries to minimize discontinuities in the 3-D LUT.

41. The renderer of claim 39, wherein said means for simulating a real-time film-appearance further includes means for providing a final image simulation to show results of the adjustment to the color gamut.

42. The renderer of claim 39, wherein said means for simulating a real-time film-appearance further includes means for providing a selection partition composited over a desaturated image to show results of a currently-edited layer in full color composited over a desaturated version of all layers underneath.

43. The renderer of claim 39, wherein said means for simulating a real-time film-appearance further includes means for providing a selection partition composited over a constant color to show results of a currently-edited layer in full color composited over a constant color such as black or white.

44. The renderer of claim 39, wherein said means for simulating a real-time film-appearance further includes means for showing a selection matte of a current layer in grayscale.

* * * * *